United States Patent Office 3,342,771
Patented Sept. 19, 1967

3,342,771
PROCESS FOR THE MODIFICATION OF POLY-
OLEFINS USING CARBOXYLIC COMPOUNDS
Roland Cheritat, Le Perreux, Seine, and Jacques Oddoux, Marly-le-Roi, France, assignors to Societe Nationale des Petroles d'Aquitaine, Paris, France
No Drawing. Filed June 3, 1964, Ser. No. 372,376
Claims priority, application France, June 4, 1963, 936,958
7 Claims. (Cl. 260—41)

The present invention relates to the preparation of polyolefins modified by chemical reaction. It covers a new process, as well as the new products obtained by chemical modification of various polyolefins according to this process.

It is known to react certain compounds with polyolefins or polydiolefins in order to modify the characteristics of the polymers, for example to raise their melting point, to make them insoluble in solvents, etc. This operation, which is frequently called "vulcanization," by analogy with that which consists in fixing sulphur on natural rubber, can be carried out by means of unsaturated dicarboxylic anhydrides or acids, as examples of compounds which react with the polymers in the sense of cross-linking the latter. In particular maleic anhydride is used, and its combination with different polymers, such as polyisobutenes, polyisoprenes, polybutadienes, copolymers of ethylene, and of propylene, polystyrene, etc., has been described and used in the prior art. One special method of vulcanizing polyolefins consists in first fixing molecules of a dicarboxylic anhydride, having a double bond, generally in the alpha-beta position, on the polymer, and then treating the cross-linked product obtained with a metal oxide. In particular magnesium or zinc oxides are used, in order to remove the anhydride function of the cross-linked product.

However, this vulcanization method leads to fairly weak lattices. The bridges formed between the macromolecules are generally separated from one another by a large number of elementary meshes. It can be established, for example, in the case of ethylenepropylene copolymers, that the short bridges of the carbon-carbon type connecting the polyolefin chains impart a certain rigidity to the macromolecule; the consequence of this being an insufficient resistance to mechanical stresses. On the other hand, the presence of decomposition products, originating from the peroxides used as initiators of the reaction in unsaturated dicarboxylic anhydrides with the polyolefins is harmful to the stability, colour and other qualities of the cross-linked product. Furthermore, it is found, during the vulcanization of the products obtained by radical cross-linking with maleic anhydride, that there is formation of bubbles which impart to the finished mass a microporous structure which is prejudicial to its mechanical resistance.

The present invention overcomes the aforesaid disadvantages by rendering possible the obtaining of cross-linked polyolefins by means of unsaturated carboxylic acids or anhydrides, which polyolefins are free from harmful impurities, are more stable and have mechanical characteristics which are better than the similar products so far prepared. The new polymers have more especially a greatly improved pliability.

The invention arises from the unexpected discovery that, if the reaction of the polyolefin with the unsaturated acid or anhydride has been carried out thermally and not by a catalytic process using a peroxide, the subsequent treatment of the product with a metal oxide leads to very different modified polyolefins. The cross-linked products thus obtained contain longer bridges with several carbon atoms, this being expressed by a better mechanical resistance. Furthermore, it appears that the new products according to the invention contain ketone groups in the cross-linking bridges, this never having been observed in the products according to the prior art.

The new process according to the invention thus consists in treating a polyolefin and/or a polydiolefin with an anhydride or a carboxylic acid having a double bond preferably disposed in the alpha-beta position, this treatment taking place under heat, in the absence of any peroxide, the product of the resulting reaction then being heated with a substance capable of being combined with the carboxyl groups of the anhydride or of the acid.

The process is applicable to various polyolefins or optionally polyolefins of aliphatic or cycloaliphatic nature, for example, the homopolymers or heteropolymers of hydrocarbons such as: ethylene, propylene, butene, isobutene, pentenes, hexenes, octenes, butadienes, styrene, methyl-styrene, etc. It is particularly useful for the treatment of elastomers, particularly of ethylene-propylene copolymers.

In the first phase of the new process, namely, the fixation on the polyolefin of a dicarboxylic anhydride, the latter may be selected from the various known anhydrides, for example maleic, chloromaleic, itaconic, citraconic anhydrides, etc.; similarly, it is possible to use unsaturated acids, such as: maleic, fumaric, chloromaleic or chlorofumaric, itaconic, acrylic, methacrylic, phenylacrylic, crotonic, sorbic, cinnamic or chlorocinnamic, aconitic, citraconic or other acids, or optionally a derivative of the acid or of the anhydride, such as an internal ester, as for example gamma-crotonolactone, or even an amide or imide, for example maleic-N-methylimide, etc. It is also possible to employ unsaturated hydroxy acids.

The polyolefin can be treated with a single unsaturated carboxylic acid or derivative, or anhydride, or even with a mixture of several of these compounds.

The proportion of carboxyl compound with respect to the polyolefin and/or the polydiolefin can vary widely depending on the degree of modification which is desired. One of the features of the invention is specifically the possibility of fixing relatively high proportions, permitting a very tight cross-linking of the polyolefin. It is more especially possible to have up to about 1 mol of carboxyl compound to 4 or 5 elementary groups of the polymer, i.e. 4 or 5 mols of corresponding monoolefin. Generally speaking, the number of mols of the carboxyl compound is 1 for 4 to 100 elementary groups of the polyolefin, and most frequently 5 to 20. Expressed by weight, these proportions naturally vary with the molecular weights of the compounds which are used.

According to the invention, the temperature of the reaction medium, during the first operational stage, that is to say, during the thermal fixation of the carboxyl compound on the polyolefin, is of the order of 180° to 400° C. However, when maleic anhydride is reacted with an elastomer such as polyethylene-propylene, the preferred temperatures range between 220° and 320° C.; and is from 265° to 295° C., when the reaction medium does not contain solvent.

The process can be carried out under different pressures, particularly between a few atmospheres and 100 atm., the minimum pressure depending on the vapour tension of the products which are present at the selected working temperature. In all cases, it is advisable to carefully remove air from the autoclave being used, and to replace the atmosphere above the reaction mixture with an inert gas, for example nitrogren, argon or carbon dioxide, free from oxygen.

According to a variant, the reaction between the polyolefin and the carboxyl compound is carried out in solution in an appropriate solvent, suitable for both substances. Frequently, and particularly in the case of ethylene-propylene copolymers cross-linked with maleic anhydride, it is possible to employ as solvents, paraffin oils, hexane, cyclohexane, toluene, xylene, etc. The concentration of polyolefin generally reaches about 1 to 10%. In view of the fairly strong vapour tensions of the majority of the solvents of practical interest, it is preferable in this variant to allow the reaction to take place at a more moderate temperature, particularly between 180° and 280° C., and preferably 220° to 260° C.

When the first operational stage of the process according to the invention is carried out in solution, it is expedient to separate the formed product from this solution, in order to submit it to the second stage, that is to say, to the action of a substance combining with the carboxyl groups. This separation can be effected by evaporation of the solvent, or even by precipitation of the modified polyolefin, with addition of a non-solvent, for example an alcohol.

According to another variant of the process, the separation is not effected before, but after the second working stage. It is then frequently facilitated by the fact that the polymer, thus modified, has become insoluble in the initially employed solvent.

In a highly advantageous embodiment of the invention, the first stage of the process is carried out in the presence of a small proportion of a stable filling agent at temperatures at which the reaction can take place. It is frequently useful to employ alumina, silica, silicates, particularly in the form of powdered dry clays, or other mineral materials which activate the reaction between polyolefins and unsaturated carboxyl compounds. These materials acts as heat catalysts and thus make it possible to operate at lower temperature. The addition of such materials to the reaction mixture is especially suitable when the final product is specifically intended to be used with fillers that may generally be present in proportions of 5% to 50% by weight of the polymer.

Depending on the temperature applied when heating the reaction medium during the first operational stage, depending on the nature of the compounds which are present and according to whether fillers are present or absent, the time necessary for the fixation of the unsaturated carboxyl compound on the polyolefin and/or polydiolefin generally varies, for example, between 10 minutes and 6 hours. For the reaction of maleic anhydride and elastomers of the polyethylene-propylene type, at temperatures from 260° to 280° C., it is of the order of 1 hour, while it reaches 4 hours in the region of 230° C. when working in solution.

The second stage of the new process, namely, the combination of the carboxyl groups of the modified polymer with an appropriate substance, takes place following the first one, generally at a lower temperature. Preferably, if an excess of carboxyl compound is present after the first stage, it is eliminated before passing to the second stage.

In regard to substances capable of being combined with carboxyl groups, it is possible to employ: metal oxides, preferably of suitable basicity, particularly those of groups II-A and II-B of the Periodic System; amines, particularly diamines; alcohols, particularly diols, and generally speaking, any substances containing functions capable of reacting with the carboxyl groups.

In the simplest practical form of the invention, the second stage consists in treating the product of the first stage with a metal oxide in the form of a fine powder, such as MgO, CaO, ZnO, etc., intimately mixed with said product.

This operation, which is called "vulcanization" in the following description, preferably takes place at temperatures of the order of 140° to 180° C. The duration thereof depends on the temperature and the nature of the treated products. It is generally about 1 hour in the region of 140° C., as compared with 10 minutes in the region of 180° C.

The vulcanization is most frequenlty carried out in moulds which are capable of giving the final shape to the articles consisting of the polymer cross-linked by the process according to the invention. The polymer which has been modified in the first stage of the process is introduced into these moulds in intimate admixture with the selected substance, particularly metal oxide, and then the moulds are heated to the aforementioned temperature for the necessary time.

The invention is illustrated by the following non-limitative examples, which show the interesting qualities of the products which are obtained.

EXAMPLE 1

100 parts by weight of ethylene-propylene copolymer, known under the trade mark Dutral P, are mixed in the cold in a mixing apparatus with 20 parts of maleic anhydride. The mixture is introduced into an autoclave, in which it is heated to 280° C. for one hour, this constituting the first stage. The product obtained is treated with ethanol in order to extract therefrom the excess maleic anhydride which has not reacted. It is then dried. The polymer, thus purified, is then intimately mixed with 20 parts of powdered ZnO, for the purpose of the second stage, which is effected by heating under pressure for 30 minutes at 165° C. the mixture containing the zinc oxide. This vulcanization leads to a final product with the following characteristics:

Breaking resistance in kg./cm.$^2$ _____ 80
Modulus at 300% elongation in kg./cm.$^2$ _____ 40
Elongation percent, at break _____ 350
Shore A hardness _____ 49

EXAMPLE 2

In a polymer preparation similar to that of Example 1, the zinc oxide is replaced by calcined magnesia in the same proportion by weight, in the vulcanization stage. The latter takes place at 170° C. for 1 hour. The product obtained has characteristics similar to those found according to Example 1.

EXAMPLE 3

To the mixture of 100 parts of copolymer with 20 parts of maleic anhydride according to Example 1, there are added, during the mixing, 20 parts of fine silica, in the commercial form known under the mark Hi–Sil 233. The mixture is then brought to 250° C. and kept at this temperature in an autoclave for 1 hour. The product obtained from the reaction is subjected to extraction with methyl alcohol until the excess of unreacted maleic anhydride is eliminated.

The product, thus purified and dried, is intimately mixed with 20 parts by weight of zinc oxide, then heated under pressure for one hour at 170° C.

The resulting vulcanized polymer has the mechanical characteristics indicated below.

Breaking resistance _____kg./cm.$^2$__ 75
Modulus at 300% elongation _____kg./cm.$^2$__ 20
Breaking elongation _____percent__ 450
Shore A hardness _____ 44

EXAMPLE 4

In a procedure similar to that of Example 3, the 20 parts by weight of silica are replaced by 20 parts of dry clay in fine powdered form. The mixture of polyolefin, maleic anhydride and clay is heated in an autoclave at 280° C. for 1 hour. The product obtained is mixed with 20 parts by weight of MgO, then vulcanized at 170° C. for 30 minutes. Its mechanical properties are then:

Breaking resistance _____kg./cm.$^2$__ 90
Modulus at 300% elongation _____kg./cm.$^2$__ 35
Breaking elongation _____percent__ 350
Shore A hardness _____ 52

EXAMPLE 5

This example illustrates the variant in which the 1st working stage is carried out in solution.

To a 1% solution of ethylene-propylene copolymer in xylene, there is added gamma-crotonolactone at the rate of 1 mol of lactone per

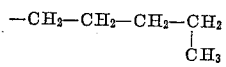

grouping. The solution is heated in a closed vessel for 4 hours at 230° C. After cooling, alcohol is added thereto in order to precipitate the modified polymer. The precipitate is redissolved in xylene and reprecipitated several times from methanol until the oxygen content in the solid obtained is constant.

It is then found that 2.5 parts by weight of gamma-crotonolactone were fixed on 100 parts of initial copolymer being used. There is thus obtained an excellent modified copolymer; it can be vulcanized with a metal oxide or a diamine in order to give a very resistant product.

EXAMPLE 6

To a 1% solution of ethylene-propylene copolymer in xylene, there is added chloromaleic anhydride at the rate of 1 part by weight to 1 part of copolymer. The mixture is heated to 230° C. for 4 hours.

After purification of the polymer thus modified, this being carried out as in Example 5, there are found 1.6% of Cl fixed in this product, this corresponding to 6.1% by weight of combined chloromaleic anhydride.

The product obtained is vulcanized with ethylene glycol at 155° C.

EXAMPLE 7

In the procedure of Example 1, the 20 parts of maleic anhydride are replaced with 13 parts of itaconic acid and 18 parts of finely powdered dry kaolin. The mixture is then heated at 245° C. for 1½ hours. The product, after having been heated with ethanol, as in Example 1, is intimately mixed with 12 parts of CaO and then heated for 50 minutes at 175° C. under compression in a mould. The material thus obtained shows characteristics similar to those of the product of Example 3.

EXAMPLE 8

In the procedure of Example 3, the maleic anhydride is replaced by crotonic acid and zinc oxide by cadmium oxide; the product obtained exhibits characteristics similar to those of the product of the above example.

EXAMPLE 9

Acrylic acid is substituted for the maleic anhydride in Example 4 and a similar product is obtained.

EXAMPLE 10

100 parts by weight of ethylene-propylene copolymer are mixed with 17 parts of maleic imide and the mixture is heated for 1 hour at 285° C. After cooling, the product obtained is washed with ethanol and dried. It is then mixed with 15 parts of ZnO and heated at 145° C. for 1 hour in a mould. The material obtained has almost the same properties as the product of Example 1.

EXAMPLE 11

The procedure of Example 3 is applied to polyisobutylene (Vistanex) and a hardened material is thus obtained.

We claim:

1. A method for modifying polyolefins which comprises the steps of: mixing a polyolefin with a carboxylic compound having an unsaturated aliphatic chain; adding to the mixture obtained from 5 to 50% by weight of a pulverulent thermal catalyst selected from the group consisting of silica, alumina and silicates; heating the mixture at a temperature of about 180° to 400° C. in the absence of any peroxide until a substantial proportion of the carboxylic compound is combined with the olefin; admixing to the thus obtained product a compound capable of combining with carboxylic groups and then heating said mixture at about 140° to 180° C. until substantial modification of the olefin is produced.

2. A method for cross-linking polyolefins, which comprises the steps of: mixing a polyolefin with a carboxylic compound having an unsaturated aliphatic chain of from 3 to 6 carbon atoms; adding to the mixture obtained from 5 to 50% by weight of a pulverulent thermal catalyst selected from the group consisting of silica, alumina and silicates; heating the mixture at a temperature of from about 180° to 400° C., in the absence of any peroxide, for a time ranging from about 10 minutes to 6 hours; admixing to the product thus formed a compound capable of combining with carboxylic groups and then heating the mixture thereby obtained at about 140° to 180° C. for about 10 to 60 minutes.

3. A method for cross-linking olefinic elastomers, which comprises the steps of: mixing an elastomer formed by the polymerization of at least one olefin having from 2 to 4 carbon atoms with a carboxylic compound having an aliphatic unsaturated chain of from 3 to 6 carbon atoms, in the proportion of 1 mole of the carboxylic compound for every 4 to 100 moles of said olefinic monomer used to produce said elastomer; adding to the mixture obtained from 5 to 50% by weight of a pulverulent thermal catalyst selected from the group consisting of silica, alumina and silicates; heating the mixture at a temperature of from about 180° to 400° C. for a time ranging from about 10 minutes to 6 hours; separating the fraction of the carboxylic compound which has not reacted with the elastomer; mixing the reaction product thus obtained with a compound capable of combining with carboxylic groups in an amount sufficient to combine with said carboxylic groups of said reaction product, and heating the mixture at about 140° to 180° C. for a time ranging from about 10 to 60 minutes.

4. A method for cross-linking elastomeric ethylene-propylene copolymers, which comprises the steps of: mixing said copolymer with from about 5 to 50% by weight of a pulverulent material selected from the group consisting of silica, clay minerals and alumina; adding to and mixing with copolymer mixture thus obtained a carboxylic compound selected from the group consisting of maleic, chloromaleic, itaconic, citraconic, fumaric, chlorofumaric, acrylic, methacrylic, phenylacrylic, crotonic, sorbic, cinnamic, chlorocinnamic and aconitic acids, the anhydrides of said acids and the imides of said acids, in the proportion of from about 1 mole of the carboxylic compound for every 4 to 100 moles of the monomers used to form said ethylene-propylene copolymer; heating said mixture at about 180° to 400° C. for a time of from about 10 minutes to 6 hours; washing the product obtained with an alcohol having 1 to 2 carbon atoms; mixing the washed product with an oxide of a metal selected from the group consisting of magnesium, zinc, calcium and cadmium, and heating the mixture at about 140° to 180° C. for about 10 to 60 minutes.

5. A method for cross-linking an ethylene-propylene copolymer, which comprises the steps of: mixing 100 parts by weight of the copolymer with 5 to 30 parts by weight of maleic anhydride; adding to the mixture thus obtained from about 5 to 50 parts by weight of a dry pulverulent material selected from the group consisting of silica, clay minerals and alumina; heating the mixture at about 220° to 320° C. until a substantial proportion of the maleic anhydride is combined with the copolymer; washing the product thus obtained with an alcohol having from 2 to 10 carbon atoms; mixing the washed product with a powdered oxide of a metal selected from the group consisting of calcium, magnesium, zinc and cadmium and then heating said product at a temperature of from about 140° to 180° C. for a time of from about 10 to 60 minutes.

6. A method for cross-linking an ethylene-propylene copolymer, which comprises the steps of: dissolving said copolymer in an organic solvent; adding to the solution thereby obtained a carboxylic compound having an unsaturated aliphatic chain and from 5 to 50% by weight of a pulverulent thermal catalyst selected from the group consisting of silica, alumina and silicates; heating the solution at a temperature of from about 180° to 280° C. until a substantial proportion of the carboxylic compound is combined with the copolymer; separating the copolymer from said organic solvent; mixing the separated copolymer with a sufficient amount of a compound capable of combining with the carboxylic groups which are combined with the copolymer and heating the mix at about 140° to 180° C. for 10 to 60 minutes.

7. A method according to claim 6, wherein the polyolefin is a polydiolefin of the butadiene type.

References Cited

UNITED STATES PATENTS 2,973,344   2/1961   Fasce _____ 260—94.9

OTHER REFERENCES

Chem. Ab., vol. 55, 279 40h (Aqueous Dispersions of Polymers Able to Form Cross-Linked Polymers).

MORRIS LIEBMAN, *Primary Examiner.*

S. FOX, *Assistant Examiner.*